(12) United States Patent
Defrank et al.

(10) Patent No.: US 11,632,917 B2
(45) Date of Patent: Apr. 25, 2023

(54) DRIP IRRIGATION HOSE WITH OUTBOARD PARALLEL INLETS

(71) Applicant: Jain Irrigation Systems Limited, Maharashtra (IN)

(72) Inventors: Michael Patrick Defrank, Pawhuska, OK (US); Ajit Bhavarlal Jain, Jalgaon (IN); Aric Olson, Frenso, CA (US); Mark Wynn, Caruthers, CA (US)

(73) Assignee: JAIN IRRIGATION SYSTEMS LIMITED, Bambhori (IN)

( * ) Notice: Subject to any disclaimer, the term of this patent is extended or adjusted under 35 U.S.C. 154(b) by 0 days.

(21) Appl. No.: 15/032,834

(22) PCT Filed: Oct. 21, 2014

(86) PCT No.: PCT/IN2014/000670
§ 371 (c)(1),
(2) Date: Apr. 28, 2016

(87) PCT Pub. No.: WO2015/075738
PCT Pub. Date: May 28, 2015

(65) Prior Publication Data
US 2016/0262319 A1 Sep. 15, 2016

(30) Foreign Application Priority Data
Oct. 28, 2013 (IN) .......................... 3385/MUM/2013

(51) Int. Cl.
*A01G 25/02* (2006.01)
(52) U.S. Cl.
CPC ........... *A01G 25/023* (2013.01); *A01G 25/02* (2013.01); *Y02A 40/22* (2018.01)

(58) Field of Classification Search
CPC .... A01G 26/02; A01G 26/023; A01G 26/026; A01G 26/06; A01G 2025/003;
(Continued)

(56) References Cited

U.S. PATENT DOCUMENTS 3,303,800 A 2/1967 Young
4,247,051 A * 1/1981 Allport .................. A01G 25/02
239/542

(Continued)

FOREIGN PATENT DOCUMENTS

CN 201957532 U 9/2011
CN 102599036 A 7/2012

OTHER PUBLICATIONS

International Search Report dated Jun. 17, 2015 for International Application No. PCT/IN2014/000670, 2 pages.
(Continued)

*Primary Examiner* — Christopher R Dandridge
(74) *Attorney, Agent, or Firm* — Troutman Pepper Hamilton Sanders LLP

(57) ABSTRACT

Disclosed is a drip irrigation hose with an emitter, devoid of fluid storage, the emitter comprising, a plurality of holes, running along a first edge and a second edge of the emitter, wherein the plurality of holes enable filtration. An inlet support positioned at a first side of the emitter, wherein the inlet support has an inverted funnel shape, with a separating structure extending from at least one corner of the inverted funnel. A first inlet positioned parallel to the plurality of holes and located along the first edge. A second inlet positioned parallel to the plurality of holes and located along the second edge. Further an outlet support positioned at a second side of the emitter.

7 Claims, 2 Drawing Sheets

(58) Field of Classification Search
CPC .... A01G 25/026; A01G 25/06; A01G 25/023; A01G 25/02; Y02A 40/22
See application file for complete search history.

(56) References Cited

U.S. PATENT DOCUMENTS

| | | | | |
|---|---|---|---|---|
| 6,736,337 | B2* | 5/2004 | Vildibill | A01G 25/023 239/533.13 |
| 7,108,205 | B1* | 9/2006 | Hashimshony | A01G 25/023 239/533.1 |
| 7,735,758 | B2* | 6/2010 | Cohen | A01G 25/023 239/542 |
| 8,002,496 | B2* | 8/2011 | Giuffre | A01G 25/023 405/43 |
| 2005/0258278 | A1* | 11/2005 | Cohen | A01G 25/023 239/542 |
| 2009/0314377 | A1* | 12/2009 | Giuffre | A01G 25/023 138/177 |
| 2012/0012682 | A1* | 1/2012 | Einav | A01G 25/023 239/542 |

OTHER PUBLICATIONS

Written Opinion dated Jun. 17, 2015 for International Application No. PCT/IN2014/000670, 4 pages.

* cited by examiner

DRIP IRRIGATION HOSE WITH OUTBOARD PARALLEL INLETS

RELATED APPLICATIONS

This application is a 35 U.S.C. § 371 national stage filing of International Application No. PCT/IN2014/000670, filed on Oct. 21, 2014, which claims benefit of and priority to Indian Patent Application No. 3385/MUM/2013, filed on Oct. 28, 2013. The contents of each of the foregoing applications are hereby incorporated by reference in their entirety.

TECHNICAL FIELD

The present subject matter described herein, in general, relates to drip irrigation, and more particularly to drip irrigation hose supplying nutrients or fluid.

BACKGROUND

Drip irrigation hoses typically have flow rates that range from 4 ml/min to 25 ml/min. These hoses are used in agricultural irrigation for fruit and vegetables products where the water quality can be laden with fine silts that are not effectively filtered out with standard filtration means. If the silts becomes too heavy the emitters will eventually become plugged and not flow.

Presently the products available use a second set of inlets. The second sets of inlets are formed by folding a flat sheet into the tube. Inherently limiting to only one set of parallel inlets to be formed.

SUMMARY

This summary is provided to introduce aspects related to a drip irrigation hose with an emitter for reducing deposition of fine silt and the aspects are further described below in the detailed description. This summary is not intended to identify essential features of the claimed subject matter nor is it intended for use in determining or limiting the scope of the claimed subject matter.

In one implementation, a drip irrigation hose with an emitter is disclosed. The emitter may be devoid of fluid storage. The emitter may further comprise of a plurality of holes running along a first edge and a second edge, wherein the plurality of holes may enable filtration of slits. Further the emitter may comprise of an inlet support positioned at a first side of the emitter. The inlet support may have an inverted funnel shape. The inlet support may further comprise a separating structure extending from at least one corner of the inverted funnel. The emitter may further comprise of a first inlet, the first inlet may be positioned parallel to the plurality of holes and can be located along the first edge. Further, the emitter may comprise a second inlet. The second inlet may be positioned parallel to the plurality of holes 106 and may be located along the second edge. The emitter 100 may further comprise an outlet support 114 positioned at a second side 212 of the emitter 100

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
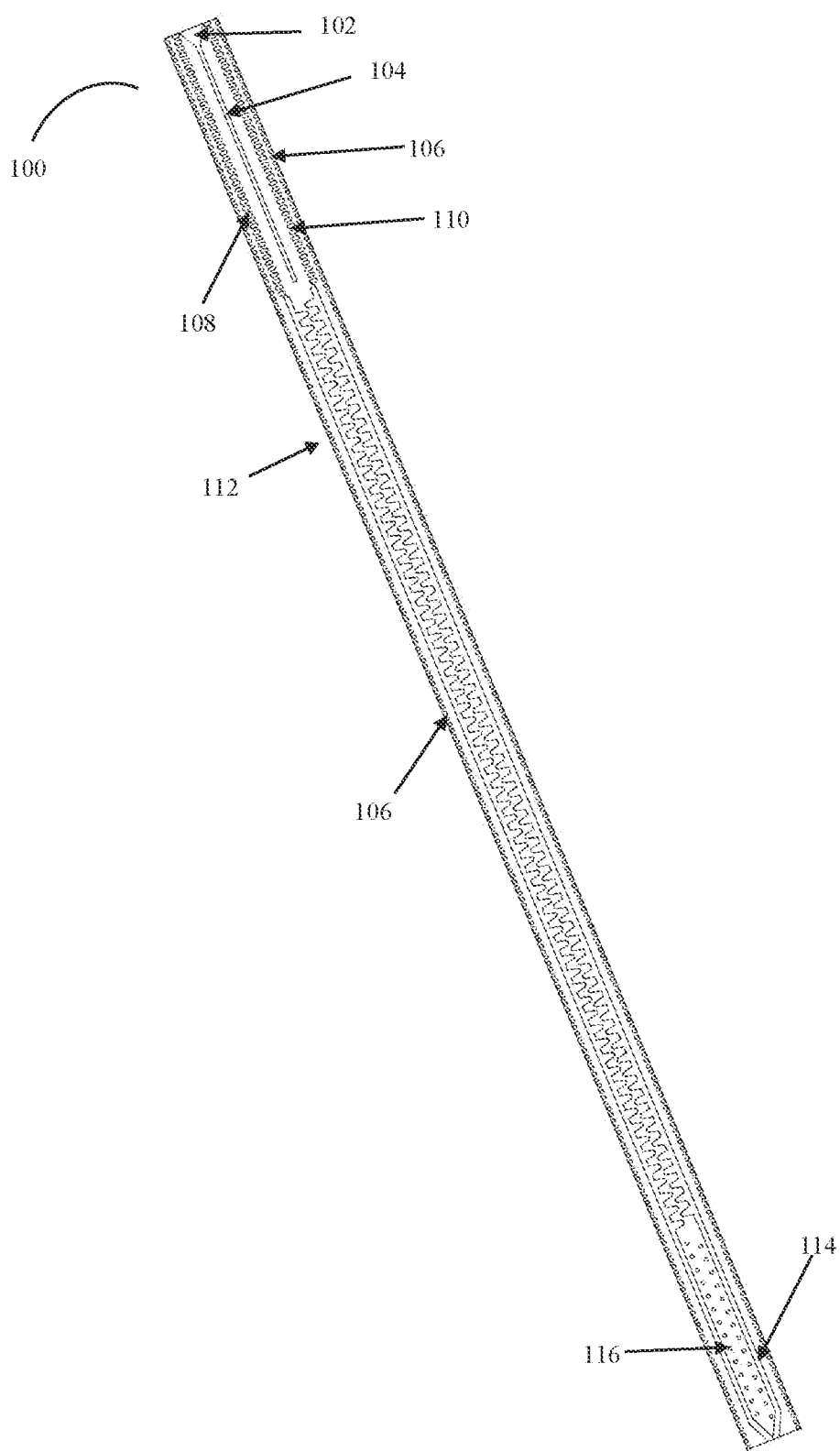
FIG. 1 illustrates a perspective view of an emitter, in accordance with an embodiment of the present subject matter.

The present subject matter discloses a drip irrigation hose with an emitter for reducing slit deposition in the drip irrigation hose.

The present disclosure, discloses a ribbon style flow path with an inlet area that may transcend into a flow regulating area and then to an outlet zone. Moreover, an additional set of inlets may be positioned parallel to the entire flow path on either side of an emitter. Having another set of inlets may contribute in improving filtering capacity. The filtering capacity can be improved up to four times, and may also help resolve loading of slit. The additional set of inlets running the entire length may enable load distribution of the slit on the entire length.

According to present disclosure an emitter for a drip irrigation hose has been disclosed. The emitter enables reduction in slit deposition and allows for better filtration of the water before supply to the roots of the plants. The emitter may also enable distribution of silt load over an entire length of the emitter or a wider range. The emitter may further comprise a first side and a second side. The emitter may further comprise an inlet support. The inlet support may have an inverted funnel shape. The inlet support may comprise a separating structure. The separating structure may resemble like a rectangular shaped partition extending from at least one corner of the inlet support with the inverted funnel shape.

The emitter may further comprise a first inlet. The first inlet can be parallel to a first edge of the emitter. The first edge may be defined has a length of the emitter or a longest edge of the emitter. The first inlet may also run parallel along the first edge of the emitter. The first inlet according to an embodiment may extend to a pre-determined length. In another embodiment the first inlet may extend along an entire length of the first edge of the emitter.

The emitter may comprise of a second inlet. The second inlet may run parallel to a second edge of the emitter. The second edge could be defined has the length of the emitter or the longest edge of the emitter, apart from the first edge, and may be parallel to the first edge. The second inlet may also run parallel along the second edge of the emitter. The second inlet according to an embodiment may extend to a pre-determined length, wherein the pre-determined length can be same as the length of first inlet, or may be different than the length of the first inlet. In another embodiment the second inlet may extend along the entire length of the second edge of the emitter.

The emitter of present disclosure may comprise at least two sets of a plurality of holes. One set from the at least two sets of the plurality of holes can run along the first edge. And another set from the at least two sets of the plurality of holes can run along the second edge. Further, the plurality of holes may run or extend the entire length of the emitter, or to a pre-set length.

According to an embodiment of the present disclosure the emitter may further comprise of a labyrinth. The labyrinth may comprise a zigzag flow channel having an alternate crest and trough. The labyrinth may be considered as a flow regulating area. According to the embodiment, the labyrinth may be parallel to the first edge and the second edge and is positioned centrally to the emitter. The labyrinth may further comprise of a first end and a second end. The emitter may further comprise an outlet support, wherein the outlet support may extend from the second end to the second side of the emitter. The outlet support may further comprise a plurality of outlet silt.

According to another embodiment of the present disclosure the plurality of holes, or the inlet support, or the separating structure, or the first inlet, or the second inlet, or the outlet support, or the labyrinth, or the plurality of outlet slit or combination thereof may be directly moulded in the emitter.

Referring now to FIG. 1, illustrates a perspective view of an emitter 100, according to an embodiment of the present disclosure. The emitter 100, may be devoid of a fluid storage. Further, the emitter may be positioned at periphery of a drip irrigation hose. The emitter 100 may further comprise an inlet support 102 positioned at a first side (Not Shown) of the emitter 100. The inlet support 102 may have an inverted funnel shape, with a separating structure 104. The separating structure 104 may extend from at least one corner of the inverted funnel. The emitter may further comprise of a plurality of holes 106, running along a first edge (Not Shown) and a second edge (Not Shown) of the emitter. The plurality of holes 106 may act has additional filter for filtration of slits and/or impurities. Further, the plurality of holes 106 may run along periphery of the emitter 100.

The emitter 100 may further comprise a labyrinth 112. The labyrinth 112 may comprise a zigzag flow channel having an alternate crest and trough. The emitter 100, may further comprise a first inlet 108. The first inlet 108 may be positioned parallel to the plurality of holes 106 and can be located along the first edge (Not Shown). Further, the first inlet 108 may extend from the first side of the emitter 100, to a first end (Not Shown) of the labyrinth 112.

A second inlet 110 can be positioned parallel to the plurality of holes 106 and may be located along the second edge (Not Shown) of the emitter 100. Further, the second inlet 110 may extend from the first side of the emitter 100, to the first end (Not Shown) of the labyrinth 112. According to an exemplary embodiment the first inlet 108 and the second inlet 110 may have substantially rectangular shape with rounded edges.

The emitter may further comprise an outlet support 114. The outlet support 114 may be positioned at a second side (Not Shown) of the emitter 100. The outlet support may extend from a second end (Not Shown) of the labyrinth 112 to a second side of the emitter 100. The outlet support 114 may further comprise a plurality of outlet slit 116.

Figure 2:
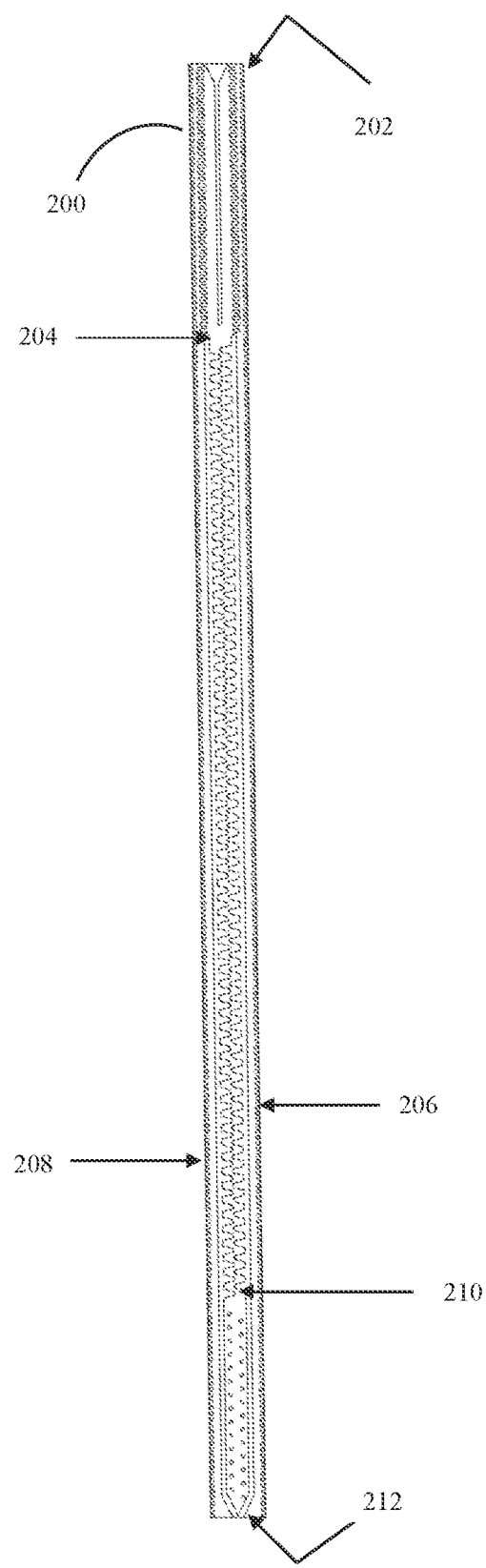
FIG. 2 illustrates a front view of an emitter, in accordance with an embodiment of the present subject matter.

Referring now to FIG. 2, illustrates a front view of an emitter 200, in accordance with an exemplary embodiment of the present subject matter. The emitter 300 may comprise a first side 202 and a second side 212. The emitter may further comprise a first edge 208 and a second edge 206. Further the emitter 200 may comprise a labyrinth (Not Shown). Further, the labyrinth may comprise a first end 204 and a second end 212.

WORKING EXAMPLE

According to an exemplary embodiment, an emitter 100 may comprise a first side 202 and a second side 212. The distance between the first side 202 and the second side 212 may be 8.07. The emitter may further comprise an inlet support 102. The inlet support 102 may comprise a separating structure 104. The separating structure may resemble like a rectangular shaped partition extending from at least one corner of the inlet support 102, and may have a thickness of 0.02.

The emitter 100 may further comprise a first inlet 108. The first inlet may have substantially rectangular shape with rounded edges, wherein the rectangular shape may have length of 0.02 and a radius of the rounded edges can be 0.02. Further, the first inlet t may extend to a length of 1.51. Similarly, the emitter may comprise of a second inlet 110. The second inlet may have similar dimension as the first inlet 108.

The emitter 100 of present disclosure may comprise a plurality of holes 106. Further, the plurality of holes may run or extend the entire length of the emitter 100 which is 8.07.

The emitter 100 may further comprise of a labyrinth 112. The labyrinth may comprise a zigzag flow channel having an alternate crest and trough. The crest and the trough may have height difference of 0.059 with an included angle of 77 degrees. The labyrinth may extend up to a length of 5.346. The labyrinth may further comprise of a first end 204 and a second end 210. The emitter may further comprise an outlet support 114, wherein the outlet support may extend from the second end 210 to the second side 212 of the emitter 100. The outlet support may further comprise a plurality of outlet silt 116. The plurality of outlet slits may have a diameter of 0.20.

We claim:

1. A drip irrigation hose with an emitter, devoid of fluid storage, the emitter comprising:

at least two sets of a plurality of holes directly moulded in the emitter, and extending along an entire length of a first edge and a second edge of the emitter, the length of the first edge and the second edge being the entire length of the emitter, wherein the at least two sets of the plurality of holes enable filtration, a set of at least two sets of the plurality of holes run along the first edge and another set of at least two sets of the plurality of holes run along the second edge, each set of plurality of holes comprises a plurality of outer holes of same size and shape, run along a periphery of the emitter and a plurality of inner holes of same size and shape run parallel to the plurality of outer holes and extend to the same length as the plurality of outer holes, wherein the plurality of inner holes is positioned parallel to the first edge and the second edge of the emitter; and three connected zones comprising an inlet area, a flow regulating area, and an outlet area, directly moulded in the emitter;

wherein the inlet area comprises:

an inlet support positioned at a first side of the emitter, wherein the inlet support has a funnel shape, with a rectangular shaped separating structure extending from at least one corner of the funnel and separating the at least two sets of the plurality of holes running along the first edge and the second edge;

wherein the plurality of inner holes comprises:

a first inlet positioned parallel to the plurality of outer holes and the first edge of the emitter, extending along the entire length of the first edge of the emitter; and a second inlet positioned parallel to the plurality of outer holes and the second edge of the emitter, extending along the entire length of the second edge of the emitter, and wherein the plurality of inner holes on the first edge and the second edge have a rectangular shape with rounded edges being different than the shape of the plurality of outer holes;

the flow regulating area comprises:

a labyrinth comprising a zigzag flow channel having alternating crests and troughs, the labyrinth having a first end at the inlet area and a second end at the outlet area; and the outlet area comprises:

an outlet support positioned at a second side of the emitter, wherein the outlet support comprises a plurality of circular outlet slits in two columns, each slit having a predefined diameter.

2. The drip irrigation hose with the emitter of claim 1, wherein the plurality of inner holes extend from the first side of the emitter, to a first end of the labyrinth.

3. The drip irrigation hose with the emitter of claim 1, wherein the outlet support extends from a second end of the labyrinth to the second side of the emitter.

4. The drip irrigation hose with the emitter of claim 1, wherein the emitter is positioned at a periphery of the drip irrigation hose.

5. The drip irrigation hose with the emitter of claim 1, wherein the plurality of holes runs along a periphery of the emitter.

6. The drip irrigation hose with the emitter of claim 1, wherein the second inlet extends to a pre-determined length, the same as the length of the first inlet.

7. The drip irrigation hose with the emitter of claim 1, wherein the second inlet extends to a pre-determined length, different than the length of the first inlet.

* * * * *